US012593111B1

(12) United States Patent
Mortensen et al.

(10) Patent No.: US 12,593,111 B1
(45) Date of Patent: ***Mar. 31, 2026

(54) CONCURRENT CHANNELS OF COMMUNICATION

(71) Applicant: United Services Automobile Association (USAA), San Antonio, TX (US)

(72) Inventors: Maland Mortensen, San Antonio, TX (US); Teddy J. Vontour, Helotes, TX (US); Emily Gray, San Antonio, TX (US); Andrew Anaruk, San Antonio, TX (US); Christopher T. Wilkinson, San Antonio, TX (US)

(73) Assignee: United Services Automobile Association (USAA), San Antonio, TX (US)

( * ) Notice: Subject to any disclaimer, the term of this patent is extended or adjusted under 35 U.S.C. 154(b) by 53 days.

This patent is subject to a terminal disclaimer.

(21) Appl. No.: 18/739,206

(22) Filed: Jun. 10, 2024

Related U.S. Application Data

(63) Continuation of application No. 17/941,330, filed on Sep. 9, 2022, now Pat. No. 12,035,021, which is a
(Continued)

(51) Int. Cl.
| | |
|---|---|
| *H04N 21/81* | (2011.01) |
| *H04N 21/2668* | (2011.01) |
| *H04N 21/41* | (2011.01) |
| *H04N 21/442* | (2011.01) |
| *H04N 21/45* | (2011.01) |
| *H04N 21/475* | (2011.01) |
| *H04N 21/478* | (2011.01) |

(52) U.S. Cl.
CPC ..... *H04N 21/8186* (2013.01); *H04N 21/2668* (2013.01); *H04N 21/4113* (2013.01); *H04N 21/4126* (2013.01); *H04N 21/44227* (2013.01); *H04N 21/4532* (2013.01); *H04N 21/475* (2013.01); *H04N 21/4781* (2013.01); *H04N 21/812* (2013.01); *H04N 21/8133* (2013.01); *H04N 21/8173* (2013.01)

(58) Field of Classification Search
CPC ........... H04N 21/8186; H04N 21/2668; H04N 21/4113; H04N 21/4126; H04N 21/44227; H04N 21/4532; H04N 21/475; H04N 21/4781; H04N 21/812; H04N 21/8133; H04N 21/8173
See application file for complete search history.

(56) References Cited

U.S. PATENT DOCUMENTS

| | | | |
|---|---|---|---|
| 8,745,191 | B2 | 6/2014 | Raleigh et al. |
| 9,329,757 | B1 | 5/2016 | Mortensen et al. |

(Continued)

*Primary Examiner* — James T Tsai
(74) *Attorney, Agent, or Firm* — Perkins Coie LLP

(57) ABSTRACT

The present disclosure provides systems, methods, and machine-readable media for concurrent communication. One method includes displaying an interactive application on a first device of a user during a break in an entertainment segment displayed on a second device, sending a request for interaction from the user through the interactive application, pausing the interactive application when the break in the entertainment segment is over, and notifying the user when an additional break begins so the user can commence interacting with the interactive application.

20 Claims, 3 Drawing Sheets

Related U.S. Application Data continuation of application No. 17/012,754, filed on Sep. 4, 2020, now Pat. No. 11,470,402, which is a continuation of application No. 15/144,626, filed on May 2, 2016, now Pat. No. 10,805,692, which is a continuation of application No. 14/031,888, filed on Sep. 19, 2013, now Pat. No. 9,329,757.

(60) Provisional application No. 61/864,006, filed on Aug. 9, 2013.

(56) References Cited

U.S. PATENT DOCUMENTS

| | | | |
|---|---|---|---|
| 10,805,692 | B1 | 10/2020 | Mortensen et al. |
| 11,470,402 | B1 | 10/2022 | Mortensen et al. |
| 2009/0075737 | A1 | 3/2009 | Harris |
| 2010/0269132 | A1 | 10/2010 | Foti |
| 2011/0055008 | A1 | 3/2011 | Feuerstein |
| 2012/0084811 | A1 | 4/2012 | Thompson et al. |
| 2012/0295686 | A1 | 11/2012 | Lockton |
| 2013/0130785 | A1 | 5/2013 | Small |
| 2013/0132992 | A1 | 5/2013 | Fellenstein, II et al. |
| 2013/0198196 | A1 | 8/2013 | Myslinski |
| 2013/0275896 | A1 | 10/2013 | Takeda |
| 2013/0312049 | A1 | 11/2013 | Niyogi et al. |
| 2021/0136458 | A1 | 5/2021 | Carney |

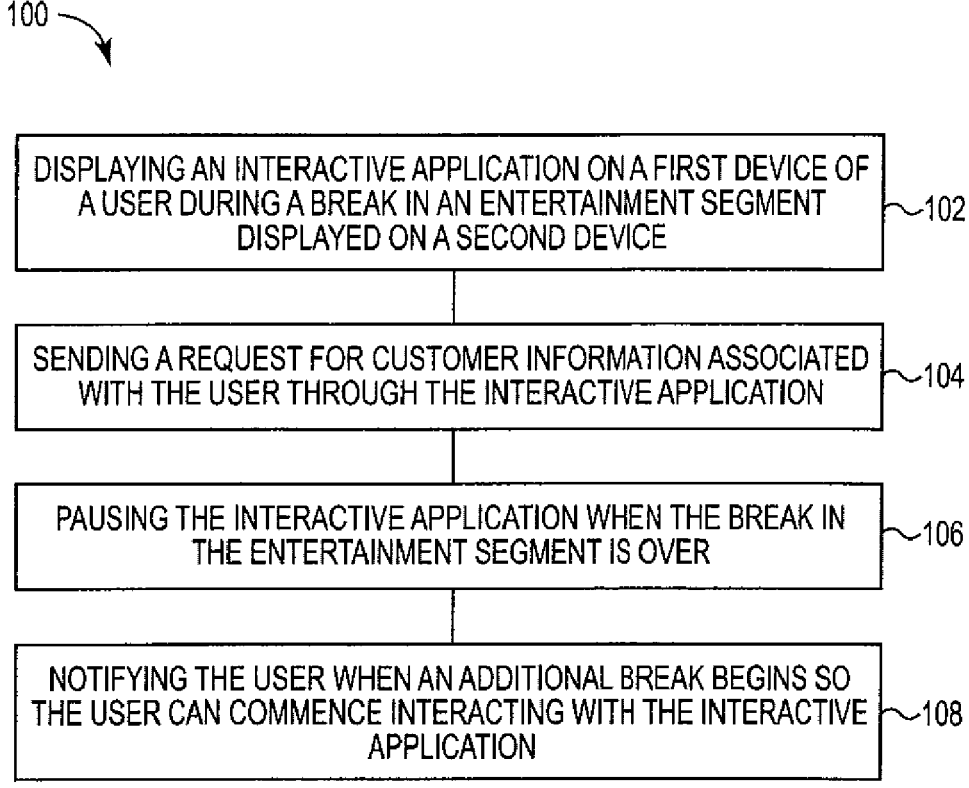

100

DISPLAYING AN INTERACTIVE APPLICATION ON A FIRST DEVICE OF A USER DURING A BREAK IN AN ENTERTAINMENT SEGMENT DISPLAYED ON A SECOND DEVICE ~102

SENDING A REQUEST FOR CUSTOMER INFORMATION ASSOCIATED WITH THE USER THROUGH THE INTERACTIVE APPLICATION ~104

PAUSING THE INTERACTIVE APPLICATION WHEN THE BREAK IN THE ENTERTAINMENT SEGMENT IS OVER ~106

NOTIFYING THE USER WHEN AN ADDITIONAL BREAK BEGINS SO THE USER CAN COMMENCE INTERACTING WITH THE INTERACTIVE APPLICATION ~108

Fig. 1

CONCURRENT CHANNELS OF COMMUNICATION

CROSS-REFERENCE TO RELATED APPLICATIONS

This application is a continuation of U.S. patent application Ser. No. 17/941,330 filed Sep. 9, 2022, now allowed, which is a continuation of U.S. patent application Ser. No. 17/012,754 filed Sep. 4, 2020, issued as U.S. Pat. No. 11,470,402 on Oct. 11, 2022, which is a continuation of U.S. patent application Ser. No. 15/144,626 filed May 2, 2016, issued as U.S. Pat. No. 10,805,692 on Oct. 13, 2020, which is a continuation of U.S. patent application Ser. No. 14/031,888 filed Sep. 19, 2013, issued as U.S. Pat. No. 9,239,757 on May 3, 2016, which claims the benefit of U.S. Provisional Application No. 61/864,006 filed Aug. 9, 2013, all of which are incorporated herein by reference in their entireties.

TECHNICAL FIELD

The present disclosure relates to methods and systems for concurrent channels of communication.

BACKGROUND

The increasing capabilities of mobile devices, such as wireless access to the Internet, has provided additional access to information for users when not strictly sitting in front of and viewing their desktop computing device. As such, it is more frequent when a computing device user is accessing the Internet while using another electronic device (e.g., a television or second computing device). For instance, a fantasy football player may watch a number of games simultaneously or watch a game and monitor his or her team via the Internet. However, these interactions are initiated by the user without any interaction with a third party to initiate such interactions.

BRIEF DESCRIPTION OF THE DRAWINGS

FIG. 1 illustrates a block diagram of an example method for concurrent channels of communication on devices according to one or more embodiments of the present disclosure.

DETAILED DESCRIPTION

Figure 2:
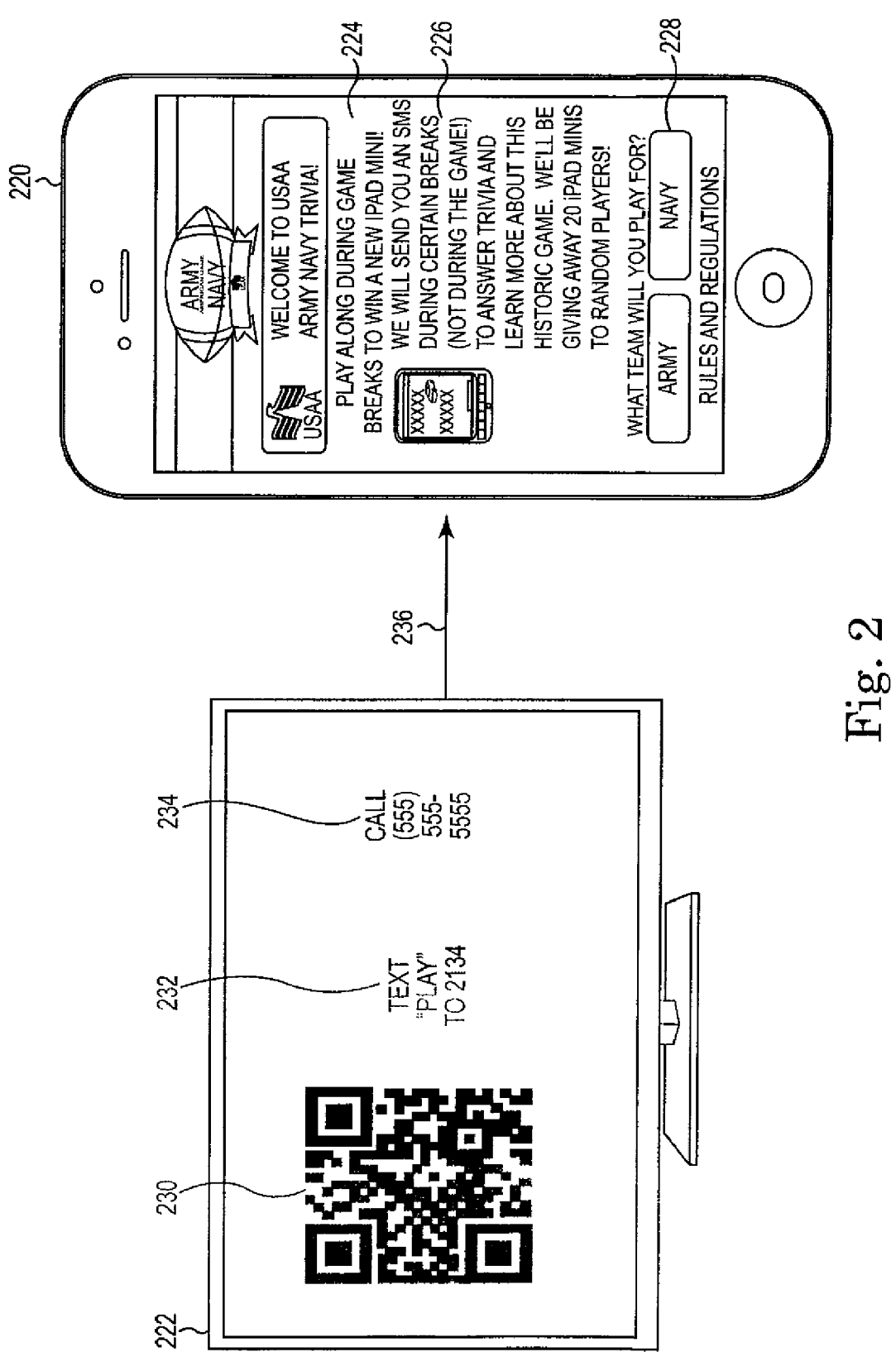
FIG. 2 illustrates an example display on a first user interface of a first computing device receiving a channel of communication concurrent with a second computing device according to one or more embodiments of the present disclosure.

The present disclosure provides method, system, and computer readable medium embodiments for concurrent channels of communication on separate devices. For example, this additional access can be sent to a mobile device concurrent to communication already being received by another device. An application on a mobile device can, for example, include computer software (e.g., executable instructions) for receiving an associated concurrent channel of communication in addition to a device already receiving communication and displaying it to the user. A first device can be displaying information to a user while a second device concurrently displays additional information for the user. For example, a first device can display a first communication while a second device concurrently displays a second communication.

The interactive application can be displayed on a first device during a break in an entertainment segment shown on a second device. An entertainment segment can include a television (TV) show, a reality TV show, a sporting event, a game show, etc. For example, the second device can include a television, a computer, a laptop, a wireless device, a screen, etc.

The interactive application can include information associated or not associated with information on the entertainment segment. For example, a documentary can be shown on a television and a first device can display an interactive application with information about the documentary and/or the subject of the documentary.

In addition, for example, the interactive application can show information not associated with the documentary. The information associated or not associated with the documentary can be shown during a break in the documentary (e.g., during a commercial break in programming).

A user can be notified about an interactive application directly or indirectly via communication from the provider of the additional information. For example, the notification can be provided in forms such as: a magazine ad, a television commercial, a reference on a website, an advertisement sent to a phone through text and/or email, a blog posting, a social networking forum, etc.

A user can send a request to an interactive application provider to send information on participating via the interactive application. The user can download a native application. The user can use a non-native application on the first device. A user can allow the interactive application to push information to the first device. For example, a user can use settings on a mobile phone to allow a particular application to send information automatically to the mobile phone without the user requesting to initiate the information to be sent.

A notification can include information indicating that the interactive application will be active during particular time periods during an entertainment segment displayed on a second device (e.g., a TV). For example, the notification can state that an application on a phone can activate when a football game being shown on TV turns to a commercial break. The notification can include information that the interactive application will pause when the entertainment segment is being displayed and resume when there is a break from the entertainment segment.

Embodiments of the present disclosure provide an application on a mobile device, that can concurrently display a communication of information to the user while a second device is displaying an additional communication of related and/or non-related information. A mobile device, as used herein, can include a mobile telephone, a tablet, a mobile personal computer, and a personal digital assistant (PDA), among other mobile devices.

Applications can include graphical user interfaces (GUI) for a user to interact with the application on the mobile device. For instance, applications can be used to display an interactive application. An interactive application can include a trivia game, supplemental information to add to the information provided by the communication on a different device, questions related to user information, etc.

A GUI, as used herein, can include a user interface that allows a user to interact with a computing device using images. A user interface can, for example, include a space where interactions between a user and a computing device occur.

A user interface can include hardware components and computer instruction components. For instance, hardware components can include input components (e.g., a mouse, a touch screen, and a keyboard) and output components for the computing device to indicate the effects of user input (e.g., display). A GUI can, for example, represent actions and tasks available to a user through graphical icons and visual indicators.

Concurrent channels of communication on different devices, in accordance with some embodiments of the present disclosure, can provide users with more channels of information. A channel of communication can include interacting with a user to obtain user information.

This user information can provide better products and services for the user. For example, a provider of services could communicate with the user to determine that the user does not currently have one or more particular services, or would benefit from different services than are currently being provided to the user. This determination can allow further communication with the user to notify the user of additional services that the service provider can provide that can benefit the user.

FIG. 1 illustrates a block diagram of an example method 100 for concurrent channels of communication on devices according to one or more embodiments of the present disclosure. At 102, the method 100 can include displaying an interactive application on a first device. An interactive application can include an application to interact with a user. For example, an interactive application can include an application with a trivia game for a user to play. An interactive application can include an application that displays information and/or particular details. The user can interact with the application using a graphical user interface (GUI).

A first application can include a native or non-native application to the first computing device, for example. A native application, as used herein, can include an application designed, developed, and/or created for use on a specific computing environment (e.g., computer language and operating system). The native application can be pre-installed on the first computing device and/or downloaded to the first computing device, for instance.

A first computing device, as used herein, can be a mobile device. For instance, a mobile device can be a mobile cellular telephone, a tablet personal computer, a mobile personal computer, and/or a PDA, among other mobile devices.

As used herein, a second device can include a stationary device. A stationary device can include a computing device that is and/or is not mobile. For example, a stationary device can include a desktop computer. In addition, a stationary device can include a television (TV).

In various embodiments of the present disclosure, a request from the first application can be wirelessly transmitted to a wireless access point of a wireless network. The wireless network can be interconnected to the Internet and/or a physical network.

A physical network can include a computer telephony integration (CTI) system and/or a plurality of computing devices. A CTI, as used herein, can refer to a combination of technologies and processes that enable or provide the integration and coordination of voice and data communications. At 104, the method can include sending a request for customer information associated with the user through the interactive application. The request for customer information can include a request for a user's name, address, phone number, current insurance information (e.g., car insurance, home insurance, health insurance, etc.), current employment status, etc.

In response to a user sending the requested information, an interactive application can send information related to the user's sent information. For example, a user can respond that the user does not currently have car insurance. The interactive application can send information about car insurance to the user.

The interactive application can display a list of products and/or services for the user to select. Once selected, the interactive application can send the user the selected information. For example, a user can have car insurance but select further information about car insurance rates to compare to their current coverage.

Displaying information and/or selecting information can occur intermittently throughout the interaction between the user and the interactive application. For example, an interactive application can ask a trivia question and receive a response answer from the user. The interactive application can then send a possible list of products and/or services the user can view. In some embodiments, the items on the list can be related to the answer that was provided by the user. Once the products and/or services are viewed, the interactive application can return to the trivia game and ask an additional question.

A request for customer information can include eligibility questions. A request for customer information can include questions related to the user's product usage. A request for customer information can be provided in a trivia format to seamlessly occur alongside the trivia questions.

At 106, the method can include pausing the interactive application when the break in the entertainment segment is over. For example, the entertainment segment can include a football game.

The interactive application can start up once the football game programming displays a commercial. Once the commercial segment is over, the interactive application can pause.

The interactive application can pause during any segment of the entertainment segment. For example, an interactive application can resume when a penalty flag is called during a football game being displayed on a second device (e.g., television). For example, an interactive application can resume when a challenge to a referee call is made by a football coach.

A commercial segment of an entertainment segment can be determined by sensing particular identifiers (e.g., audio, visual cues, etc.). For example, particular words of a commercial can indicate a commercial segment is occurring. A commercial segment can be identified by an administrator that views a display of the entertainment segment and notifies a system when the commercial segment begins. For example, an administrator can be watching the entertainment segment and when a commercial segment begins, the administrator can indicate the beginning of the commercial segment via a computing device. The notification can be a nearly instantaneous notification. The commercial segment can be identified by a device based on cues in the commercial segment and/or audio and/or additional characteristics. The cues can determine when information is pushed to a first device (e.g., device of a user) when a commercial segment begins on a second device (e.g., programming device, television, etc.).

At 108, the method can include notifying the user when an additional break begins so the user can commence interacting with the interactive application. A notification to a user can include a pushed (e.g., forced, sent without prompting, etc.) message to a first device (e.g., a mobile phone, a tablet computer, a laptop computer, etc.).

A notification to a user can, for example, include a text message. A notification to a user can include a text message to a third device (e.g., an additional mobile phone). In some implementations, a notification to a user can include an email to a first device (e.g., a mobile device, a mobile phone, a tablet computer, a laptop computer, etc.). A notification can include a notification on the entertainment segment reminding a user to return to an interactive application.

FIG. 2 illustrates an example display on a first user interface of a first computing device receiving a channel of communication concurrent with a second computing device according to one or more embodiments of the present disclosure. As shown in FIG. 2, a first computing device 220 can include communication 236 concurrent with a second computing device 222.

The first computing device 220 can be a mobile device (e.g., a mobile phone, a laptop, a table computer, etc.). The second computing device can include a stationary device or a mobile device (e.g., a mobile phone, a laptop computer, a television, etc.). The first computing device 220 can display an explanation of a trivia game 224. For example, the explanation can include a prize (e.g., a new I-pad mini) to win.

An interactive application that includes a trivia game can be a trivia game among a particular group of people. For example, a group of friends can participate in the interactive application (e.g., trivia game) and can play against one another for a particular prize and/or outcome. The prize can include a discount on a service and/or products. The prize can include a free quote for a person in the group.

The first computing device 220 can display an explanation 226 of how the interactive application will work concurrent with the entertainment segment. The interactive application can include a button and/or buttons 228 to select in order for the user to respond to the interactive application (e.g., select Navy to be on that team).

The second computing device 222 can display a number of ways to connect to the concurrent communication 236. A second computing device 222 can display a scan code 230. The scan code 230 can be scanned by a first computing device 220 in order to display an interactive application on a first computing device 220.

In some embodiments, a second computing device 222 can display directions to text a particular message to a particular phone number 232. Following the directions to text 232 can enable receiving a connection to concurrent communication 236 (e.g., a website link texted to the computing device that texted, an email sent with information to connect, a link to an online location to download an application, etc.).

A second computing device 222 can display a phone number to call 234 in order to gain access to an interactive application. The previous examples are not exhaustive of the plurality of ways in which a second computing device can provide and/or display directions to a user to access an interactive application on a first computing device.

The first computing device 220 can display an interactive application during (e.g., concurrently with) a commercial break displayed on a second computing device. The interactive application can display information related to the commercial break.

In some embodiments, the information related to the commercial break can counter a message in the commercial break. For example, the commercial break can promote a first insurance company. The interactive application can display information explaining why the promotion of the first insurance company is in error or may be misrepresenting facts, for example. The interactive application can compare the promoted first insurance company to a second insurance company and inform a user why the second insurance company has a particular product and/or service that the user may prefer over the product and/or service of the first insurance company.

Figure 3:
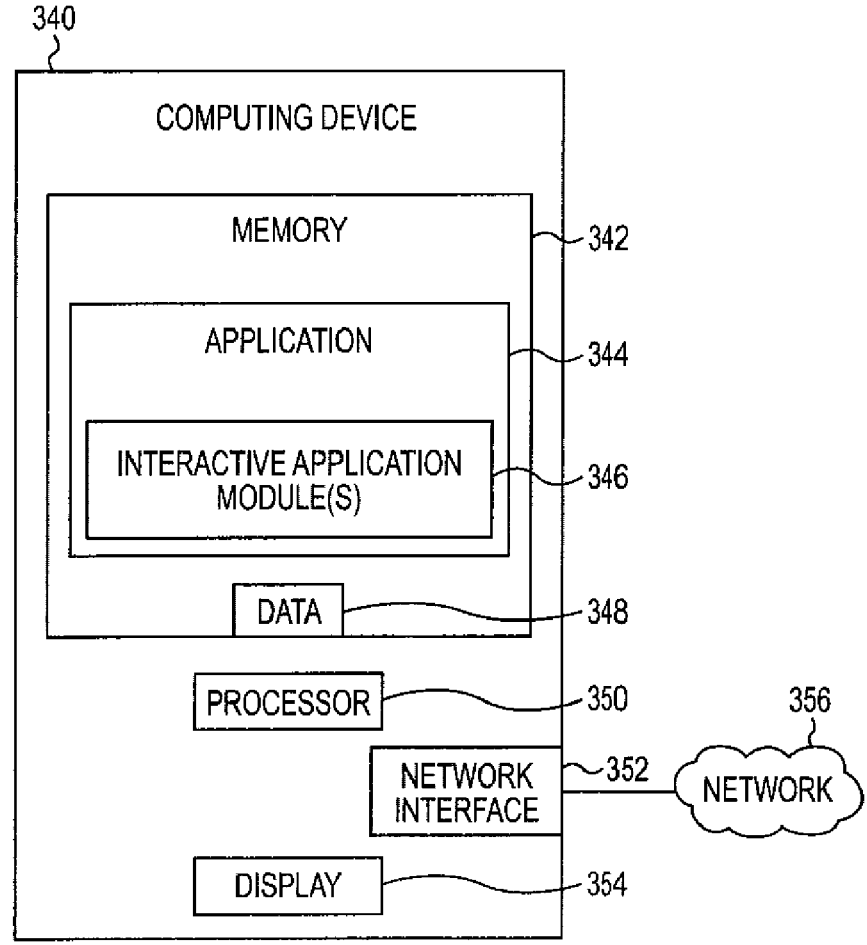
FIG. 3 illustrates a block diagram of an example system according to one or more embodiments of the present disclosure.

FIG. 3 illustrates a block diagram of an example computing system that can be utilized with one or more embodiments of the present disclosure. The computing system can include a computing device 340. A computing device can be, for example, a laptop computer, a desktop computer, and/or a mobile device (e.g., a mobile phone, a personal computing device, a PDA, etc.), among other types of computing devices.

The computing device 340 can include a memory 342 and a processor 350 coupled to memory 342. Memory 342 can be any type of storage medium that can be accessed by processor 350 to perform various examples of the present disclosure (e.g., send first application display data, etc.). For example, memory 342 can be a non-transitory computing device readable medium having computing device readable instructions (e.g., computing device program instructions, machine readable instructions, computer readable instructions, etc.) and data 348 stored thereon.

The computing device readable instructions are executable by processor 350 to perform various examples of the present disclosure. The data 348 can be used (e.g., analyzed by) the computing device readable instructions during their execution.

Memory 342 can be volatile or nonvolatile memory. Memory 342 can also be removable (e.g., portable) memory, or non-removable (e.g., internal) memory. For example, memory 342 can be random access memory (RAM) (e.g., dynamic random access memory (DRAM) and/or phase change random access memory (PCRAM)), read-only memory (ROM) (e.g., electrically erasable programmable read-only memory (EEPROM) and/or compact-disc read-only memory (CD-ROM)), flash memory, a laser disc, a digital versatile disc (DVD) or other optical disk storage, and/or a magnetic medium such as magnetic cassettes, tapes, or disks, among other types of memory.

Further, although memory 342 is illustrated as being located in computing device 340, embodiments of the present disclosure are not so limited. For example, memory 342 can, in addition to or alternatively, be located internal to another computing resource (e.g., enabling computer readable instructions to be downloaded over the Internet or another wired or wireless connection).

The computing device 340 can include a network interface 352. A network interface 352 can connect the computing device 350 to a network, such as network 356 illustrated in FIG. 3.

Network 356 can be a wired or wireless network, such as, for instance, a wide area network (WAN) such as the Internet, a local area network (LAN), a personal area network (PAN), a campus area network (CAN), or metropolitan area network (MAN), among other types of networks. As used herein, a "network" (e.g., network 356) can provide a communication system that directly or indirectly links two or more computers and/or peripheral devices and allows users to access resources on other computing resources (e.g., computing devices and/or data storage devices) and/or exchange messages with other users.

A network can allow users to share resources on their own systems with other network users and to access information on centrally located systems or on systems that are located at remote locations. For example, network 356 can tie a number of computing devices together to form a distributed control network (e.g., permit a computing device to connect to a repository of multimedia files hosted and/or uploaded to a central server by other computing devices accessing the network).

A network may provide connections to the Internet and/or to the networks of other entities (e.g., organizations, institutions, etc.). Users may interact with network-enabled computing device applications to make a network request, such as to get a file or print on a network printer. Applications may also communicate with network management software, which can interact with network hardware to transmit information between devices on the network.

The computing device 350 can include a display (e.g. display 354). A display 354 can include, for example, a screen that can provide (e.g., display and/or present) information to a user of computing device 350. For example, the display 354 can be used to display a user interface.

Additionally, the computing device 340 can receive information from the user of computing device 340 through an interaction with the user via display (e.g., display 354). For instance, the computing device 340 can receive input from the user (e.g., first user) via display 354 (e.g., a touch screen display or via another user input device such as a keyboard in response to interaction with items show on the display). For example, a user can enter the input into the computing device 340 using a mouse and/or keyboard associated with the computing device 340 (e.g., display 354).

The computing device 340 can include an application 344. The application 344 can, for instance, be stored in the memory 342 of the computing device 340. The application 340 can include an interactive application module 346. A module, as used herein, can include program instructions (e.g., computer readable instructions) to perform a particular act, task, and/or function when executed by a processor.

By way of illustration and not by way of limitation, the interactive application module 346 can include a number of instructions (e.g., a number of computer readable instructions) that can be executed by the processor 350 to perform or achieve a particular task and/or complete the task of contacting and/or connecting with (e.g., by text, by email, by a pushed messaged, etc.) a user during a break of an entertainment segment displayed on a second computing device. Contacting and/or connecting with a user can be performed during a displayed entertainment segment on a second computing device to supplement content on the entertainment segment.

In some embodiments of the present disclosure, the interactive application module 346 can include instructions that can be executed by the processor 350 to display an interactive application (e.g., a trivia game, a display of additional information, etc.) that interacts with a user. The instructions can be executed to request user information (e.g., user name, address, telephone number, insurance policy number, etc.).

The user information can be used to determine products and/or services (e.g., an insurance policy) for the user. In some embodiments, the user information can be used to determine if an entity can provide additional products and/or services (e.g., insurance coverage) for the user. The user information can be used to provide additional information about products and/or services (e.g., insurance coverage)

and/or contact information (e.g., an entity phone contact, address location, etc.) for the user to request more information.

In some embodiments of the present disclosure, the interactive application module 346 can include instructions that can be executed by the processor 350 to pause when the entertainment segment (e.g., a sports game, a television program, a television movie, etc.) is no longer displaying a break from the entertainment segment (e.g., a displayed commercial break).

As will be appreciated, elements shown in the various embodiments herein can be added, exchanged, and/or eliminated so as to provide a number of additional embodiments of the present disclosure. In addition, as will be appreciated, the proportion and the relative scale of the elements provided in the figures are intended to illustrate the embodiments of the present disclosure and should not be taken in a limiting sense. As used herein, "a" or "a number of used in referring to a particular thing is intended refer to one or more such things.

Although specific embodiments have been illustrated and described herein, those of ordinary skill in the art will appreciate that any arrangement calculated to achieve the same techniques can be substituted for the specific embodiments shown. This disclosure is intended to cover any and all adaptations or variations of various embodiments of the disclosure.

It is to be understood that the above description has been made in an illustrative fashion, and not a restrictive one. Combination of the above embodiments, and other embodiments not specifically described herein will be apparent to those of skill in the art upon reviewing the above description.

The scope of the various embodiments of the disclosure includes any other applications in which the above structures and methods are used. Therefore, the scope of various embodiments of the disclosure should be determined with reference to the appended claims, if provided, along with the full range of equivalents to which such claims are entitled.

In the foregoing Detailed Description, various features are grouped together in example embodiments illustrated in the figures for the purpose of streamlining the disclosure. This method of disclosure is not to be interpreted as reflecting an intention that the embodiments of the disclosure require more features than are expressly recited in each claim.

Rather, inventive subject matter lies in less than all features of a single disclosed embodiment. Thus, the claims, if provided, are hereby incorporated into the Detailed Description, with each claim standing on its own as a separate embodiment.

What is claimed is:

1. A method comprising:

detecting a first product is being displayed by a first device associated with a user during a break in an entertainment segment;

determining the user previously purchased a second product related to the first product; and in response to determining the user previously purchased the second product, sending, to an interactive application executing on a second device associated with the user, a comparison of a first set of features of the first product to a second set of features of the second product; and a recommendation for the user to add one or more features to the second product based on the comparison of the first set of features of the first product to the second set of features of the second product.

2. The method of claim 1, further comprising:

sending, to the first device, a notification that the interactive application will be active on the second device during the break in the entertainment segment.

3. The method of claim 1, further comprising:

receiving, from the second device, user information that includes a data field including at least one of a customer identifier, a customer phone number, a customer location, a customer social networking profile, a usage of a product, or a usage of a service.

4. The method of claim 1, further comprising:

identifying the break in the entertainment segment of visual or audio content being output by the first device.

5. The method of claim 1, wherein the interactive application provides a connection to a group of users to take part in an activity associated with the entertainment segment.

6. The method of claim 1, wherein the interactive application is part of an interactive, multiplayer game containing information associated with the break or the entertainment segment.

7. The method of claim 1, wherein the break is a commercial break.

8. A system comprising:

one or more processors; and one or more memories storing instructions that, when executed by the one or more processors, cause the system to perform a process comprising:

detecting a first product is being displayed by a first device associated with a user during a break in an entertainment segment;

determining the user previously purchased a second product related to the first product; and in response to determining the user previously purchased the second product, sending, to an interactive application executing on a second device associated with the user, a comparison of a first set of features of the first product to a second set of features of the second product; and a recommendation for the user to add one or more features to the second product based on the comparison of the first set of features of the first product to the second set of features of the second product.

9. The system of claim 8, wherein the process further comprises:

sending, to the first device, a notification that the interactive application will be active on the second device during the break in the entertainment segment.

10. The system of claim 8, wherein the process further comprises:

receiving, from the second device, user information that includes a data field including at least one of a customer identifier, a customer phone number, a customer location, a customer social networking profile, a usage of a product, or a usage of a service.

11. The system of claim 8, wherein the process further comprises:

identifying the break in the entertainment segment of visual or audio content being output by the first device.

12. The system of claim 8, wherein the interactive application provides a connection to a group of users to take part in an activity associated with the entertainment segment.

13. The system of claim 8, wherein the interactive application is part of an interactive, multiplayer game containing information associated with the break or the entertainment segment.

14. The system of claim 8, wherein the break is a commercial break.

15. A non-transitory computer-readable medium storing instructions that, when executed by a computing system, cause the computing system to perform operations comprising:

detecting a first product is being displayed by a first device associated with a user during a break in an entertainment segment;

determining the user previously purchased a second product related to the first product; and in response to determining the user previously purchased the second product, sending, to an interactive application executing on a second device associated with the user, a comparison of a first set of features of the first product to a second set of features of the second product; and a recommendation for the user to add one or more features to the second product based on the comparison of the first set of features of the first product to the second set of features of the second product.

16. The non-transitory computer-readable medium of claim 15, wherein the operations further comprise:

sending, to the first device, a notification that the interactive application will be active on the second device during the break in the entertainment segment.

17. The non-transitory computer-readable medium of claim 15, wherein the operations further comprise:

receiving, from the second device, user information that includes a data field including at least one of a customer identifier, a customer phone number, a customer location, a customer social networking profile, a usage of a product, or a usage of a service.

18. The non-transitory computer-readable medium of claim 15, wherein the operations further comprise:

identifying the break in the entertainment segment of visual or audio content being output by the first device.

19. The non-transitory computer-readable medium of claim 15, wherein the interactive application provides a connection to a group of users to take part in an activity associated with the entertainment segment.

20. The non-transitory computer-readable medium of claim 15, wherein the interactive application is part of an interactive, multiplayer game containing information associated with the break or the entertainment segment, and wherein the break is a commercial break.

* * * * *